United States Patent Office 3,555,039
Patented Jan. 12, 1971

3,555,039
IMIDAZO[1,2-c]THIAZOLES
Robert E. Manning, Mountain Lakes, N.J., assignor to Sandoz-Wander, Inc., Hanover, N.J., a corporation of Delaware
No Drawing. Filed Jan. 22, 1968, Ser. No. 699,306
Int. Cl. C07d 49/34, 91/26
U.S. Cl. 260—306.7                4 Claims

ABSTRACT OF THE DISCLOSURE

This disclosure pertains to 5-imino-2,3-dihydroimidazo-[1,2-c]thiazoles, e.g., 7 - phenyl-5-imino - 2,3 - dihydro-1H,5H-imidazo[1,2-c]thiazole hydrochloride. These compounds are useful as hypotensive agents and as CNS stimulants.

This invention relates to novel heterocyclic compounds. In particular, this invention pertains to 7-phenyl and 7-substituted phenyl-5-imino-2,3-dihydroimidazo thiazoles, to acid addition salts thereof and to methods for preparing these compounds. The invention also relates to intermediates useful in the preparation of said imidazothiazoles and to processes for preparing the intermediates.

The imidazothiazoles of the present invention may be represented by the following structural formula:

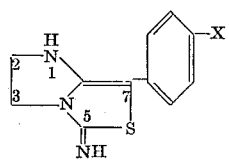

(I)

wherein X represents H or halo having an atomic weight of about 19–80.

These novel compounds (I) may be prepared by treating in solvent an α-chlorobenzylimidazoline of the formula

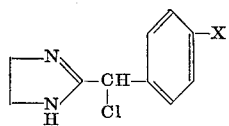

(II)

wherein X is as defined above, or an acid addition salt thereof with a thiocyanate of the formula

RSCN                (III)

wherein R represents a monovalent cation.

According to the above process, the compounds illustrated by Formula II are treated in solvent with a thiocyanate (III) such as an alkali or alkaline earth metal thiocyanate, e.g., sodium thiocyanate, potassium thiocyanate and the like, or ammonium thiocyanate. Solvents which may be used include alcohols such as loweralkanols, e.g., methanol, ethanol and isopropanol, acetone, and the like, or mixtures thereof. The reaction may be conducted at a temperature of about 25° C. to about 100° C., preferably 50° C. to about 80° C. Neither the particular solvent nor the temperature utilized is critical in obtaining the imidazo thiazoles of Formula I. The resulting products are recovered utilizing conventional recovery techniques such as evaporation, crystallization and the like.

The starting compounds (II) for the above process are prepared by chlorinating an α-hydroxybenzyl imidazoline of the formula

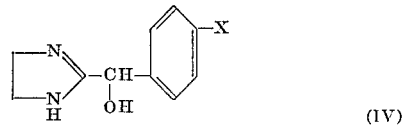

(IV)

wherein X is as earlier defined, or an acid addition salt thereof, with thionyl chloride.

In accordance with the above process for preparing the compounds defined according to Formula II the appropriate α-hydroxybenzyl-imidazoline of Formula IV above is chlorinated with thionyl chloride, preferably in an inert solvent such as chlorinated hydrocarbon, e.g., methylene chloride and chloroform. The reaction may be conducted at a temperature of from about 0° C. to about 70° C., preferably 30° C. to about 50° C., and is most conveniently conducted at the reflux temperature of the system. The particular reaction temperature and solvent are not critical in obtaining the compounds (II) and excess thionyl chloride may be used as solvent, if desired. Certain of the α-hydroxybenzyl imidazoline starting materials (IV) are known and can be prepared according to methods described in the literature. The compounds of Formula IV not specifically disclosed may be prepared according to analogous methods from known materials.

When the acid addition salt of either of compounds (I) or (II) is obtained and it is desired to secure the corresponding free base, such compound may be obtained using conventional methods, such as by dissolving the product in solvent such as tetrahydrofuran and treating the resulting solution with a base such as sodium carbonate. If, on the other hand, the acid addition salt is desired, it may be readily obtained from the free base by salification.

The compounds represented by Formula I above are useful because they possess pharmacological properties in animals. In particular, the compound of Formula I where X represents H is useful as an antihypertensive agent as indicated by its activity in an anesthetized dog provided a dosage of 10–20 mg./kg. of active ingredient, i.v., and tested by blood pressure measurement using a mercury manometer or transducer via a catheter inserted in the carotid or femoral artery.

Said compound is also useful as an appetite suppressant as indicated by its activity in Wistar rats dosed with 50 mg./kg. of agent and tested using the free feeding method described by Randall et al. (J.P.E.T., 129:163, 1960). The rats are deprived of food for 18 hours but receive water ad libitum. Consumption of ground food is then measured over a four hour period following intraperitoneal injection of the test compound. The compounds of Formula I wherein X represents said halo are useful as central nervous system stimulants, particularly as antidepressants, as indicated by their activity in mice dosed orally or intraperitoneally with 25 mg./kg. of test compound and tested for reserpine reversal effect using a modification of the method described by Brodie et al. (J. Pharmacol. & Exper. Therap., 116:9, 1956) and Chessin et al. (J. Pharmacol. & Exper. Therap., 119:453, 1957), and for DOPA (dihydroxyphenylalanine) reversal effect using a modification of the method of Everett et al. (Fed. Proc., 23:198, 1964).

When utilized for the aforesaid purposes, these various compounds may be combined with one or more pharmaceutically acceptable carriers or adjuvants. They may be administered orally or parenterally and, depending upon the compound employed and the mode of administration, the exact dosage utilized may vary.

Furthermore, the compounds of Formula I may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluene-sulfonate, benzene-sulfonate and the like.

In general, satisfactory results are obtained when the compounds are administered for their hypotensive and anorexic uses at a daily dosage of about 1–25 milligrams per kilogram of animal body weight and 0.5–75 milligrams per kilogram of animal body weight, respectively. This daily dosage is preferably administered 2 to 4 times a day, or in sustained release form. For most large mammals, the total daily dosage for these respective uses is about 100–500 milligrams and about 50–200 milligrams. Dosage forms suitable for internal hypotesive use comprise from about 25 milligrams to about 250 milligrams of the active compound in intimate admixture with a solid or liquid pharmaceutically acceptable carrier or diluent, whereas corresponding dosage forms for the anorexic utility comprise from about 12.5–100 milligrams of active agent.

The compounds useful as antidepressants provide generally satisfactory results when administered at a daily dosage of about 0.5 milligram to about 100 milligrams per kilogram of animal body weight, preferably administered 2 to 4 times daily or in sustained release form. For most large mammals, the total daily dosage when the compounds are used as antidepressants is about 50 milligrams to about 250 milligrams. Dosage forms suitable for internal use comprise about 12.5 milligrams to about 125 milligrams of the active compound in intimate admixture with a solid or liquid pharmaceutically acceptable carrier or diluent.

A representative formulation suitable for oral administration is a tablet prepared by standard tabletting techniques which contains the following:

| Ingredient: | Parts by weight |
| --- | --- |
| 7 - phenyl-5-imino-2,3-dihydro-1H,5H-imidazo-[1,2-]thiazole hydrochloride | 30 |
| Tragacanth | 2 |
| Lactose | 59.5 |
| Corn starch | 5 |
| Talcum | 3 |
| Magnesium stearate | 0.5 |

The following examples are provided for the purpose of illustration and not by way of limitation. They are not intended so as to limit the scope of the invention as defined in the appended claims.

EXAMPLE 1

2-(α-chlorobenzyl)-2-imidazoline hydrochloride

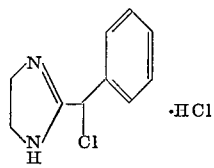

A mixture of 2-(α-hydroxybenzyl)-2-imidazoline hydrochloride (79 g.) in methylene chloride (1600 ml.) and thionyl chloride (47 g.) is heated under reflux for 24 hours. The reaction mixture is evaporated in vacuo. The resultant syrup is dissolved in 25 ml. methanol, and 180 ml. acetone, and 25 ml. ether is then added.

The resultant solid is collected to give 61 g. of 2-(α-chlorobenzyl)-2-imidazoline hydrochloride; M.P. 165–171° C.

EXAMPLE 2

2-(α,p-dichlorobenzyl)-2-imidazoline hydrochloride

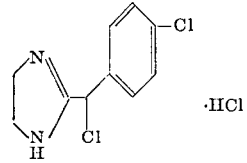

A mixture of 2-(p-chloro-α-hydroxybenzyl)-2-imidazoline hydrochloride (28 g.) in methylene chloride (560 ml.) and thionyl chloride (13.5 g.) is heated under reflux for one hour. The reaction mixture is evaporated in vacuo and the residue is crystallized from ethanol (25 ml.) and ether (100 ml.) to give 21.8 g. of 2-(α,p-dichlorobenzyl)-2-imidazoline hydrochloride; M.P. 199–203° C. with decomposition.

EXAMPLE 3

7-phenyl-5-imino-2,3-dihydro-1H,5H-imidazo[1,2-c]thiazole hydrochloride

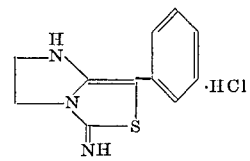

A solution of 2-(α-chlorobenzyl)-2-imidazoline hydrochloride (11.5 g.) in 10 ml. methanol and 50 ml. acetone is added to a solution of ammonium thiocyanate (3.75 g.) in acetone (100 ml.). The resultant precipitate (NH₄Cl) is removed by filtration and the filtrate evaporated in vacuo. The residue is taken up in 150 ml. acetone and the solution refluxed overnight. After cooling, the resultant crystals are collected by filtration to give 10 g. of solid.

Recrystallization from methanol-ether (1:3) gives 7.0 g. of 7-phenyl-5-imino-2,3-dihydro-1H,5H-imidazo[1,2-c]thiazole hydrochloride; M.P. 224–227° C. with decomposition.

EXAMPLE 4

7-p-chlorophenyl-5-imino-2,3-dihydro-1H,5H-imidazo[1,2-c]thiazole hydrochloride

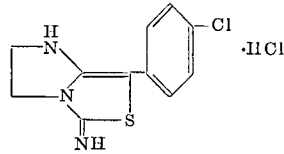

A solution of 2-(α,p-dichlorobenzyl)-2-imidazoline hydrochloride (13.3 g.) in methanol (15 ml.) and acetone (20 ml.) is added to a solution of ammonium thiocyanate (3.75 g.) in 100 ml. acetone. The resultant precipitate (NH₄Cl) is removed by filtration and the filtrate evaporated in vacuo. The residue is taken up in acetone (120 ml.) and refluxed for 20 hours. After cooling, the resultant crystals are collected by filtration to give 10.5 g. of solid.

Recrystallization from methanol affords 8.5 g. of 7-p-chlorophenyl-5-imino-2,3-dihydro-1H,5H - imidazo[1,2-c]thiazole hydrochloride; M.P. 230–232° C. with decomposition.

What is claimed is:

1. A compound of the formula

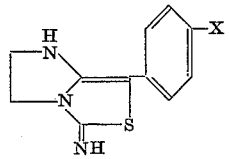

or a pharmaceutically acceptable acid addition salt thereof where X represents H or halo having an atomic weight of 19–80.

2. The compound of claim 1 which is 7-phenyl-5-imino-2,3-dihydro-1H,5H-imidazo[1,2-c]thiazole.

3. The compound of claim 1 which is 7-p-chlorophenyl-5-imino-2,3-dihydro-1H,5H-imidazo[1,2-c]thiazole.

4. A process for preparing a compound of claim 1 which comprises treating in solvent a compound of the formula

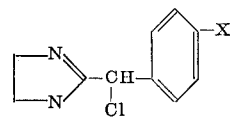

with a compound of the formula

RSCN where

X represents H or halo having an atomic weight of 19–80, and

R represents a monovalent cation.

References Cited

UNITED STATES PATENTS 2,993,497   4/1960   Dodson _____ 260—306.7

ALTON D. ROLLINS, Primary Examiner

U.S. Cl. X.R.

260—309.6; 424—270